United States Patent
Marty et al.

(10) Patent No.: US 7,806,141 B2
(45) Date of Patent: Oct. 5, 2010

(54) MIXING VALVE INCLUDING A MOLDED WATERWAY ASSEMBLY

(75) Inventors: Garry Robin Marty, Fishers, IN (US); Kyle Robert Davidson, Fishers, IN (US); Steven Kyle Meehan, Fishers, IN (US); Darrell Scott Crowe, Lebanon, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 853 days.

(21) Appl. No.: 11/700,598

(22) Filed: Jan. 31, 2007

(65) Prior Publication Data

US 2008/0178950 A1 Jul. 31, 2008

(51) Int. Cl.
*F16K 11/087* (2006.01)
(52) U.S. Cl. .................. 137/625.41; 137/801
(58) Field of Classification Search .......... 137/613, 137/801, 625.41, 625.4; 251/129.04; 4/623
See application file for complete search history.

(56) References Cited

U.S. PATENT DOCUMENTS

| | | | |
|---|---|---|---|
| 2,200,091 A | 5/1940 | Kovach |
| 2,219,471 A | 10/1940 | Davis |
| 2,546,327 A | 3/1951 | Young |
| 2,548,933 A | 4/1951 | Barnett |
| 2,781,786 A | 2/1957 | Young |
| 2,884,007 A | 4/1959 | Green |
| 3,229,710 A | 1/1966 | Keller, III |
| 3,422,849 A | 1/1969 | Manoogian |
| 3,448,768 A | 6/1969 | Keller, III |
| 3,505,098 A | 4/1970 | Miller, et al. |
| 3,520,325 A | 7/1970 | Stuart |
| 3,580,289 A | 5/1971 | James et al. |
| 3,590,876 A | 7/1971 | Young |
| 3,600,723 A | 8/1971 | Mongerson et al. |
| 3,714,958 A | 2/1973 | Johnson et al. |
| 3,757,824 A | 9/1973 | Parkhurst et al. |
| 3,770,004 A | 11/1973 | Johnson et al. |
| 3,796,380 A | 3/1974 | Johnson et al. |
| 3,807,453 A | 4/1974 | Dom et al. |
| 3,854,493 A | 12/1974 | Farrell |
| 3,965,936 A | 6/1976 | Lyon |
| 3,989,787 A | 11/1976 | Scott, Jr. et al. |
| 3,998,240 A | 12/1976 | Liautaud |
| 4,026,328 A | 5/1977 | Nelson |
| 4,076,279 A | 2/1978 | Klotz et al. |

(Continued)

FOREIGN PATENT DOCUMENTS

DE 10133041 1/2003

(Continued)

OTHER PUBLICATIONS

Noveon, Inc.; Processing with TempRite® PEX Ensures Quality Piping, www.tempritepex.com/processingInstallation/processing. asp, at least as early as Jun. 7, 2005, 2 pgs.

(Continued)

*Primary Examiner*—Kevin L Lee
(74) *Attorney, Agent, or Firm*—Baker & Daniels LLP

(57) ABSTRACT

A fluid delivery device including a valve body fluidly coupled to an electrically insulating waterway assembly. The waterway assembly may include a molded base.

14 Claims, 13 Drawing Sheets

U.S. PATENT DOCUMENTS

| | | |
|---|---|---|
| 4,103,709 A | 8/1978 | Fischer |
| 4,130,136 A | 12/1978 | Garnier et al. |
| 4,221,338 A | 9/1980 | Shames et al. |
| 4,316,870 A | 2/1982 | Rowley |
| 4,337,795 A | 7/1982 | Argyris et al. |
| 4,356,574 A | 11/1982 | Johnson |
| 4,357,957 A | 11/1982 | Bisonaya et al. |
| 4,387,738 A | 6/1983 | Bisonaya et al. |
| 4,397,330 A | 8/1983 | Hayman |
| 4,415,389 A | 11/1983 | Medford et al. |
| 4,446,084 A | 5/1984 | Rowley |
| 4,453,567 A | 6/1984 | MacDonald |
| 4,458,839 A | 7/1984 | MacDonald |
| 4,484,600 A | 11/1984 | Peterson et al. |
| 4,502,507 A | 3/1985 | Hayman |
| 4,513,769 A | 4/1985 | Purcell |
| 4,525,136 A | 6/1985 | Rowley |
| 4,552,171 A | 11/1985 | Farrell et al. |
| 4,577,835 A | 3/1986 | Holycross et al. |
| 4,580,601 A | 4/1986 | Schlotman et al. |
| 4,592,388 A | 6/1986 | Wilcox |
| 4,607,659 A | 8/1986 | Cole |
| 4,610,429 A | 9/1986 | Arnold et al. |
| 4,626,005 A | 12/1986 | Stifter |
| 4,635,673 A | 1/1987 | Gerdes |
| 4,649,958 A | 3/1987 | Purcell |
| 4,652,263 A | 3/1987 | Herweck et al. |
| 4,664,423 A | 5/1987 | Rowley |
| 4,667,987 A | 5/1987 | Knebel |
| 4,671,316 A | 6/1987 | Botnick |
| 4,687,025 A | 8/1987 | Kahle et al. |
| 4,700,928 A | 10/1987 | Marty |
| 4,708,172 A | 11/1987 | Riis |
| 4,749,003 A | 6/1988 | Leason |
| 4,754,993 A | 7/1988 | Kraynick |
| 4,760,871 A | 8/1988 | Vijay |
| 4,762,143 A | 8/1988 | Botnick |
| 4,773,348 A | 9/1988 | Rowley |
| 4,783,303 A | 11/1988 | Imgram |
| 4,803,033 A | 2/1989 | Rowley |
| 4,838,304 A | 6/1989 | Knapp |
| 4,853,164 A | 8/1989 | Kiang et al. |
| 4,877,660 A | 10/1989 | Overbergh et al. |
| 4,887,642 A | 12/1989 | Bernat |
| 4,942,644 A | 7/1990 | Rowley |
| 4,957,135 A | 9/1990 | Knapp |
| 4,971,112 A | 11/1990 | Knapp |
| 4,979,530 A | 12/1990 | Breda |
| 5,001,008 A | 3/1991 | Tokita et al. |
| 5,006,207 A | 4/1991 | Peterman et al. |
| 5,027,851 A | 7/1991 | Drees et al. |
| 5,053,097 A | 10/1991 | Johansson et al. |
| 5,090,062 A | 2/1992 | Hochstrasser |
| 5,095,554 A | 3/1992 | Gloor |
| 5,100,565 A | 3/1992 | Fujiwara et al. |
| 5,110,044 A | 5/1992 | Bergmann |
| 5,127,814 A | 7/1992 | Johnson et al. |
| 5,131,428 A | 7/1992 | Bory |
| 5,148,837 A | 9/1992 | Ågren et al. |
| 5,150,922 A | 9/1992 | Nakashiba et al. |
| 5,219,185 A | 6/1993 | Oddenino |
| 5,279,333 A | 1/1994 | Lawerence |
| 5,340,018 A | 8/1994 | Macdonald et al. |
| 5,366,253 A | 11/1994 | Nakashiba et al. |
| 5,375,889 A | 12/1994 | Nakashiba et al. |
| 5,397,102 A | 3/1995 | Kingman |
| 5,417,242 A | 5/1995 | Goncze |
| 5,437,345 A | 8/1995 | Schmidt et al. |
| 5,493,873 A | 2/1996 | Donselman et al. |
| 5,494,259 A | 2/1996 | Peterson |
| 5,518,027 A | 5/1996 | Saiki et al. |
| 5,527,503 A | 6/1996 | Rowley |
| 5,553,935 A | 9/1996 | Burnham et al. |
| 5,555,912 A | 9/1996 | Saadi et al. |
| 5,558,128 A | 9/1996 | Pawelzik et al. |
| 5,566,707 A | 10/1996 | Ching et al. |
| 5,573,037 A | 11/1996 | Cole et al. |
| 5,577,393 A | 11/1996 | Donselman et al. |
| 5,579,808 A | 12/1996 | Mikol et al. |
| 5,582,438 A | 12/1996 | Wilkins et al. |
| 5,586,746 A | 12/1996 | Humpert et al. |
| 5,611,093 A | 3/1997 | Barnum et al. |
| 5,615,709 A | 4/1997 | Knapp |
| 5,622,210 A | 4/1997 | Crisman et al. |
| 5,622,670 A | 4/1997 | Rowley |
| 5,642,755 A | 7/1997 | Mark et al. |
| 5,660,692 A | 8/1997 | Nesburn et al. |
| 5,669,407 A | 9/1997 | Bailey |
| 5,669,417 A | 9/1997 | Lian-Jie |
| 5,669,595 A | 9/1997 | Bytheway |
| 5,685,341 A | 11/1997 | Chrysler et al. |
| 5,687,952 A | 11/1997 | Arnold et al. |
| 5,695,094 A | 12/1997 | Burnham et al. |
| 5,725,008 A | 3/1998 | Johnson |
| 5,730,173 A | 3/1998 | Sponheimer |
| 5,741,458 A | 4/1998 | Rowley |
| 5,746,244 A | 5/1998 | Woolley, Sr. et al. |
| 5,756,023 A | 5/1998 | Stachowiak |
| 5,758,690 A | 6/1998 | Humpert et al. |
| 5,775,587 A | 7/1998 | Davis |
| 5,803,120 A | 9/1998 | Bertoli |
| 5,813,435 A | 9/1998 | Knapp |
| 5,833,279 A | 11/1998 | Rowley |
| 5,850,855 A | 12/1998 | Kerschbaumer et al. |
| 5,857,489 A | 1/1999 | Chang |
| 5,861,200 A | 1/1999 | Rowley |
| 5,865,473 A | 2/1999 | Semchuchk et al. |
| 5,875,809 A | 3/1999 | Barrom |
| 5,893,387 A | 4/1999 | Paterson et al. |
| 5,895,695 A | 4/1999 | Rowley |
| 5,916,647 A | 6/1999 | Weinstein |
| 5,924,451 A | 7/1999 | Kuo |
| 5,927,333 A | 7/1999 | Grassberger |
| 5,934,325 A | 8/1999 | Brattoli et al. |
| 5,937,892 A | 8/1999 | Meisner et al. |
| 5,944,225 A | 8/1999 | Kawolics |
| 5,950,663 A | 9/1999 | Bloomfield |
| 5,960,490 A | 10/1999 | Pitch |
| 5,965,077 A | 10/1999 | Rowley et al. |
| 5,975,143 A | 11/1999 | Järvenkylä et al. |
| 5,979,489 A | 11/1999 | Pitch |
| 6,003,170 A | 12/1999 | Humpert et al. |
| 6,013,382 A | 1/2000 | Coltrinari et al. |
| 6,023,796 A | 2/2000 | Pitch |
| 6,029,860 A | 2/2000 | Donselman et al. |
| 6,029,948 A | 2/2000 | Shafer |
| 6,044,859 A | 4/2000 | Davis |
| 6,053,214 A | 4/2000 | Sjoberg et al. |
| 6,062,251 A | 5/2000 | Pitch |
| 6,070,614 A | 6/2000 | Holzheimer et al. |
| 6,070,916 A | 6/2000 | Rowley |
| 6,073,972 A | 6/2000 | Rivera |
| 6,079,447 A | 6/2000 | Holzheimer et al. |
| 6,082,407 A | 7/2000 | Paterson et al. |
| 6,082,780 A | 7/2000 | Rowley et al. |
| 6,085,784 A | 7/2000 | Bloom et al. |
| 6,116,884 A | 9/2000 | Rowley |
| 6,123,232 A | 9/2000 | Donselman et al. |
| 6,131,600 A | 10/2000 | Chang |
| 6,138,296 A | 10/2000 | Baker |
| 6,155,297 A | 12/2000 | MacAusland et al. |
| 6,161,230 A | 12/2000 | Pitsch |
| 6,170,098 B1 | 1/2001 | Pitsch |
| 6,177,516 B1 | 1/2001 | Hudak |

| | | | | | | |
|---|---|---|---|---|---|---|
| 6,202,686 B1 | 3/2001 | Pitsch et al. | | 2004/0060608 A1 | 4/2004 | Angus |
| 6,227,464 B1 | 5/2001 | Allmendinger et al. | | 2004/0117906 A1 | 6/2004 | Baker et al. |
| 6,238,575 B1 | 5/2001 | Patil | | 2004/0150132 A1 | 8/2004 | Rowley |
| 6,256,810 B1 | 7/2001 | Baker | | 2004/0176503 A1 | 9/2004 | Czayka et al. |
| 6,270,125 B1 | 8/2001 | Rowley et al. | | 2005/0005989 A1 | 1/2005 | Roloff |
| 6,286,808 B1 | 9/2001 | Slothower et al. | | 2005/0194051 A1 | 9/2005 | Pinette |
| 6,287,501 B1 | 9/2001 | Rowley | | 2006/0108705 A1 | 5/2006 | Rowley |
| 6,293,336 B1 | 9/2001 | Emerick, Sr. et al. | | 2006/0118185 A1 | 6/2006 | Nobili |
| 6,296,017 B2 | 10/2001 | Kimizuka | | 2006/0124183 A1 | 6/2006 | Kuo |
| 6,305,407 B1 | 10/2001 | Selby | | 2006/0130907 A1 | 6/2006 | Marty et al. |
| 6,315,715 B1 | 11/2001 | Taylor et al. | | 2006/0130908 A1 | 6/2006 | Marty et al. |
| 6,328,059 B1 | 12/2001 | Testori et al. | | 2006/0170134 A1 | 8/2006 | Rowley et al. |
| 6,334,466 B1 | 1/2002 | Jani et al. | | 2006/0174955 A1 | 8/2006 | Huang |
| 6,341,617 B1 | 1/2002 | Wilson | | 2006/0202142 A1 | 9/2006 | Marty et al. |
| 6,349,733 B1 | 2/2002 | Smith | | 2007/0044852 A1 | 3/2007 | Pinette |
| 6,378,790 B1 | 4/2002 | Paterson et al. | | 2007/0137714 A1 | 6/2007 | Meehan et al. |
| 6,385,794 B1 | 5/2002 | Miedzius et al. | | 2007/0137718 A1 | 6/2007 | Rushlander et al. |
| 6,439,581 B1 | 8/2002 | Chang | | 2007/0246267 A1 | 10/2007 | Koottungal |
| 6,464,266 B1 | 10/2002 | O'Neill et al. | | 2007/0246550 A1 | 10/2007 | Rodenbeck et al. |
| 6,485,666 B1 | 11/2002 | Rowley | | 2007/0246564 A1 | 10/2007 | Rodenbeck et al. |
| 6,557,907 B2 | 5/2003 | Rowley | | 2007/0271695 A1 | 11/2007 | Thomas et al. |
| 6,609,732 B1 | 8/2003 | Souvatzidis et al. | | 2008/0271238 A1 | 11/2008 | Reeder et al. |
| 6,635,334 B1 | 10/2003 | Jackson et al. | | 2009/0039176 A1 | 2/2009 | Davidson et al. |
| 6,640,357 B1 | 11/2003 | Chang | | 2010/0012194 A1 | 1/2010 | Jonte et al. |
| 6,732,543 B2 | 5/2004 | Jenkins, Jr. et al. | | 2010/0096017 A1 | 4/2010 | Jonte et al. |
| 6,770,376 B2 | 8/2004 | Chen | | | | |
| 6,770,384 B2 | 8/2004 | Chen | | | | |

FOREIGN PATENT DOCUMENTS

| | | |
|---|---|---|
| EP | 0 632 220 | 1/1995 |
| EP | 0 808 952 | 11/1997 |
| JP | 3094877 | 4/1991 |
| JP | 200132343 | 2/2001 |
| WO | WO 91/05191 | 4/1991 |
| WO | WO 00/61831 | 10/2000 |
| WO | WO 02/25022 | 3/2002 |
| WO | WO 2005/108829 | 11/2005 |
| WO | WO/2008/094651 | 8/2008 |

| | | |
|---|---|---|
| 6,783,160 B2 | 8/2004 | Rowley |
| 6,803,133 B2 | 10/2004 | Chen |
| 6,817,379 B2 | 11/2004 | Perla |
| 6,835,777 B2 | 12/2004 | Botros |
| 6,838,041 B2 | 1/2005 | Rowley |
| 6,848,719 B2 | 2/2005 | Rowley |
| 6,860,523 B2 | 3/2005 | O'Neill et al. |
| 6,860,524 B1 | 3/2005 | Rowley |
| 6,877,172 B2 | 4/2005 | Malek et al. |
| 6,894,115 B2 | 5/2005 | Botros |
| 6,902,210 B1 | 6/2005 | Rowley |
| 6,920,899 B2 | 7/2005 | Haenlein et al. |
| 6,959,736 B2 | 11/2005 | Järvenkylä |
| 6,962,168 B2 | 11/2005 | McDaniel et al. |
| 6,968,860 B1 | 11/2005 | Haenlein et al. |
| 6,978,795 B2 | 12/2005 | Perrin |
| 7,063,105 B1 | 6/2006 | Chen |
| 7,111,640 B2 | 9/2006 | Rhodes |
| 7,118,138 B1 | 10/2006 | Rowley et al. |
| 7,134,452 B2 | 11/2006 | Hiroshi et al. |
| 7,150,293 B2 | 12/2006 | Jonte |
| 7,225,828 B2 | 6/2007 | Giagni et al. |
| 7,231,936 B2 | 6/2007 | Chang |
| 7,232,111 B2 | 6/2007 | McDaniel |
| 7,415,991 B2 * | 8/2008 | Meehan et al. ............... 137/801 |
| 7,537,195 B2 | 5/2009 | McDaniel |
| 7,690,395 B2 | 4/2010 | Jonte et al. |
| 2002/0100139 A1 | 8/2002 | Rowley |
| 2002/0100510 A1 | 8/2002 | Otelli |
| 2002/0167171 A1 | 11/2002 | Becker et al. |
| 2003/0183286 A1 | 10/2003 | Yang |
| 2004/0007278 A1 | 1/2004 | Williams |
| 2004/0021120 A1 | 2/2004 | Turnau, III et al. |

OTHER PUBLICATIONS

PPI Plastics Pipe Institute, Crosslinked Polyethylene (PEX) Tubing, TN-17/2001, www.plasticpipe.org/pdf/pubs/notes/tn17-01.pdf, Jun. 2001, 7 pgs.

SpecialChem S.A., Silane Crosslinking Agents Center, Crosslinking Mechanism, www.specialchem4polymers.com/tc/silane-crosslink-ing-agents/index.aspx?id=mechanism, at least as early as Jun. 7, 2005, 2 pgs.

Dadex Polydex, 2005, 1 pg.

Dadex Polydex—PPR Pipe System for Hot and Cold Water Supply and Distribution, 2005, 2 pgs.

Dow, Plastic Pipes Europe, Middle East & Africa, Hot and Cold Water Pipes, 2007, 1 pg.

Dow, Plastic Pipes Europe, Middle East, & Africa, Dowlex PE-RT, 2007, 2 pgs.

Kerox, Standard Cartridges, 2005, 3 pgs.

Kerox, Ceramic Mixing Cartridge, Conventional Single-Lever Type, Model K-28, undated, 2 pgs.

Ticona Engineering Polymers, Engineering Polymers for Innovative Applications catalog, Mar. 2006, 16 pgs.

PEX Association, What is PE-X?, undated, 7 pgs.

* cited by examiner

MIXING VALVE INCLUDING A MOLDED WATERWAY ASSEMBLY

BACKGROUND AND SUMMARY OF THE INVENTION

The present invention relates to fluid delivery devices, and more particularly, to a mixing valve for use with a faucet and including a molded waterway assembly.

Single handle faucets typically include mixing valves that control the flow of both hot and cold water to a delivery spout. These faucets have found wide acceptance and are commonly constructed such that a handle or knob is movable in distinct directions to adjust the temperature (i.e., the mix of hot and cold water) and the flow rate of water.

Conventional mixing valves typically include a machined brass body and associated brass fittings. The brass body usually includes a hot water inlet, a cold water inlet, and a mixed water outlet. An adjustable valve element, typically either a mixing ball or a slidable plate, is manipulated by a handle to control the aforementioned temperature and flow rate of water. In conventional faucets, copper tubes are usually brazed to the inlets and the outlet(s) of the valve body and to associated fittings. Following the brazing operation, an etching or bright dip operation is typically performed to clean the metal surfaces of contaminants.

It may be appreciated that such conventional mixing valves have certain disadvantages. For example, the cost of copper tubing and the additional assembly cost associated with the brazing and bright dipping operations may be significant. The bright dipping operation may also result in the undesirable deposit of metal on the valve body. As such, it is known that the use of plastic materials for waterways may reduce cost, eliminate metal contact, and provide protection against acidic and other aggressive water conditions. The use of non-metallic materials in plumbing fixtures is significant given the growing concern about the quality of potable water. The U.S. Environmental Protection Agency, NSF International (National Sanitary Foundation) and other health-related organizations are actively seeking to reduce the metal content (i.e., copper and lead) in water.

As such, there is a need for a fluid delivery device, such as a mixing valve, which may use a standard brass body while eliminating brazing and bright dipping operations.

According to an illustrative embodiment of the present disclosure, a waterway includes a base having an upper surface and a lower surface, a first inlet opening extending through the upper surface, an outlet opening extending through the upper surface and positioned in spaced relation to the inlet opening, and a first projection surrounding the first inlet opening and extending upwardly from the upper surface.

According to another illustrative embodiment of the present disclosure, a fluid delivery device includes a waterway assembly having a base supported by the holder, a hot water inlet tubular member having a first end fluidly coupled to the base and a second end configured to be fluidly coupled to a hot water supply, a cold water inlet tubular member having a first end fluidly coupled to the base and a second end configured to be fluidly coupled to a cold water supply, and an outlet tubular member having a first end fluidly coupled to the base and a second end. The base includes an upwardly extending first projection in fluid communication with the hot water inlet, and an upwardly extending second projection in fluid communication with the cold water inlet. A valve assembly includes a hot water inlet port receiving the first projection and in fluid communication with the hot water inlet tubular member, a cold water inlet port receiving the second projection and in fluid communication with the cold water tubular member, an outlet port in fluid communication with the outlet tubular member, and a lower surface facing an upper surface of the base. The valve assembly further includes a movable valve member configured to control the flow of water from the hot water inlet port and the cold water inlet port to the outlet port.

According to a further illustrative embodiment of the present disclosure, a fluid delivery device includes a waterway assembly having a first inlet fluid transport component with opposing first and second ends, an outlet fluid transport component with opposing first and second ends, and a base with an upper surface and a lower surface. The base is fluidly coupled to the first end of the first inlet fluid transport component and the first end of the outlet fluid transport component. A channel is formed within the upper surface of the base. A valve assembly includes a first inlet port in fluid communication with the first inlet fluid transport component, an outlet port in fluid communication with the outlet fluid transport component, and a planar lower surface facing the upper surface of the base. The valve assembly includes a movable valve member configured to control the flow of water from the first inlet port to the outlet port. A seal is received within the channel of the base and sealingly engages the planar lower surface of the valve assembly.

According to a further illustrative embodiment of the present disclosure, a fluid delivery device includes a holder formed of an electrically non-conductive material, and a waterway assembly supported by the holder and formed of an electrically non-conductive material. A valve assembly is fluidly coupled to the waterway assembly and includes a valve body formed of an electrically conductive material. An electrical conductor is electrically coupled to the valve body and to a capacitive sensor.

According to another illustrative embodiment of the present disclosure, a fluid delivery device includes a waterway assembly having an outlet tubular member and formed of an electrically non-conductive material. A manual valve assembly is fluidly coupled to the waterway assembly. An actuator driven valve assembly is also fluidly coupled to the waterway assembly. A controller is in electrical communication with the actuator driven valve assembly. A capacitive sensor is in electrical communication with the controller and is configured to detect the touch of a user, wherein the controller controls the actuator driven valve in response to the touch detected by the capacitive sensor.

According to a further illustrative embodiment of the present disclosure, a fluid delivery device includes a valve assembly having a valve body and a bonnet supported by the valve body. The bonnet includes a flange defining a retaining groove. A sleeve is received over the valve assembly and includes a lip defining an opening and configured to be received within the retaining groove. The flange selectively prevents axial removal of the sleeve from the bonnet.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
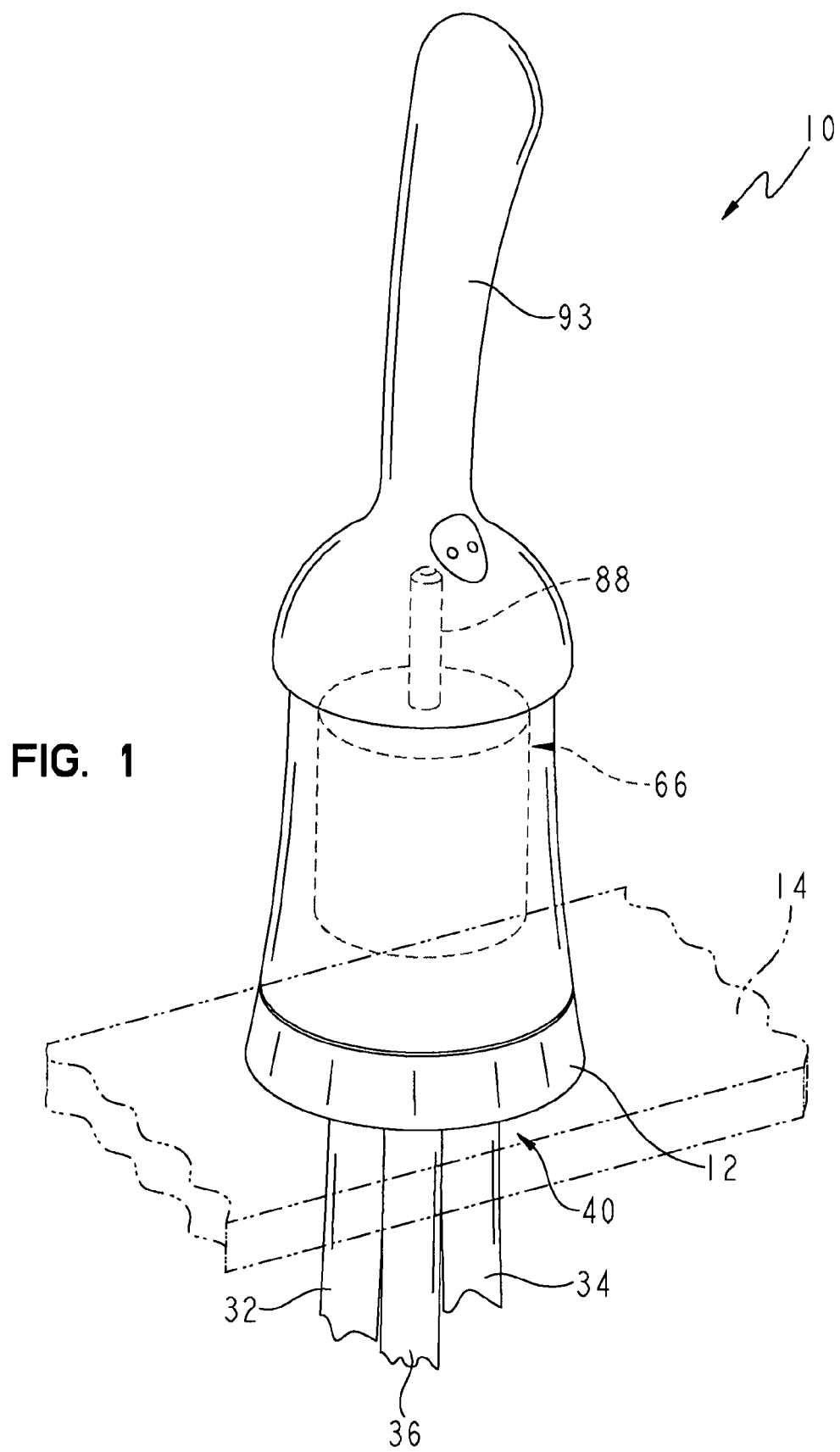
FIG. 1 is a perspective view of the mixing valve of the present disclosure, illustrating the valve body in phantom.
Figure 2:
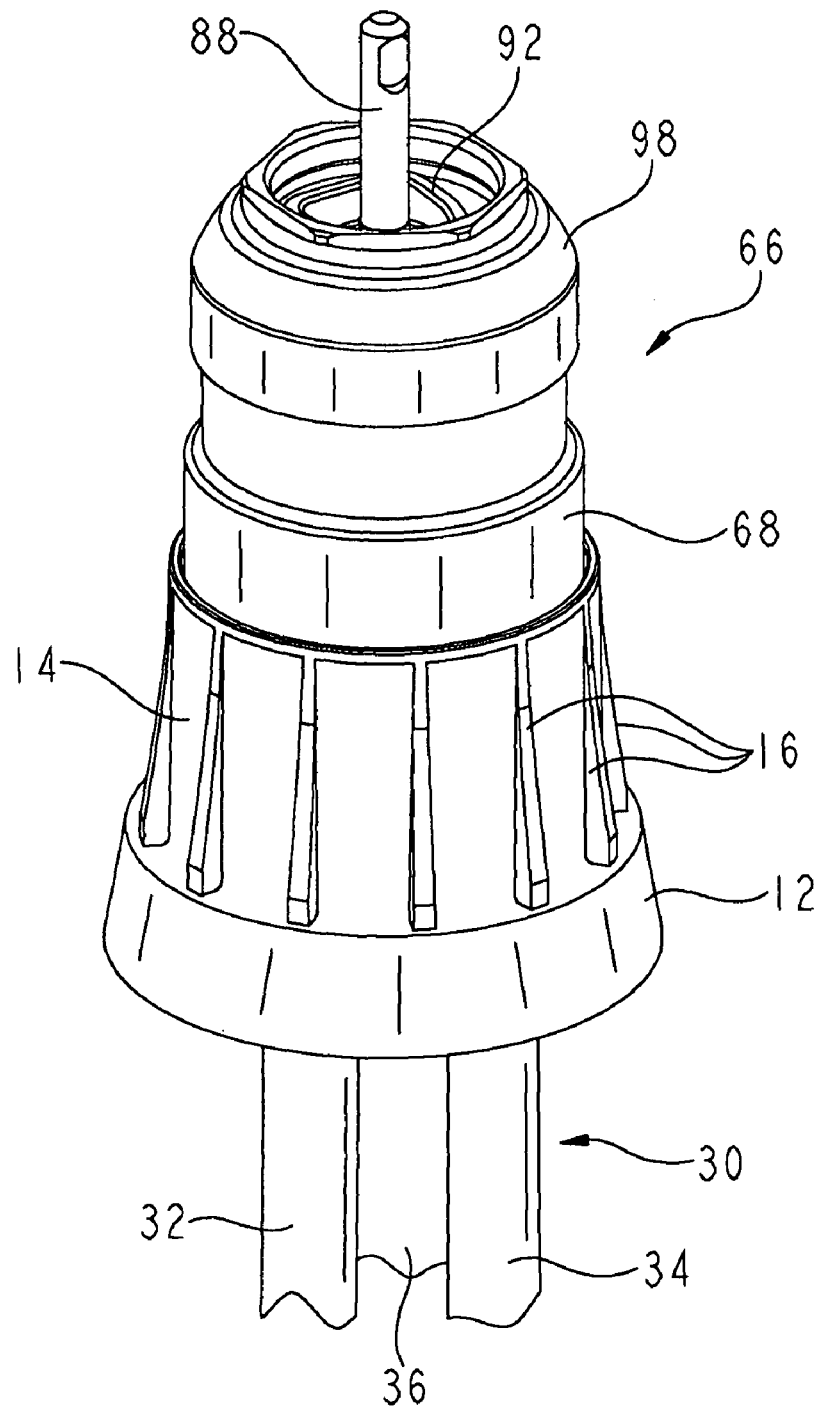
FIG. 2 is a partial perspective view of the mixing valve of FIG. 1, with the handle removed for clarity.
Figure 3:
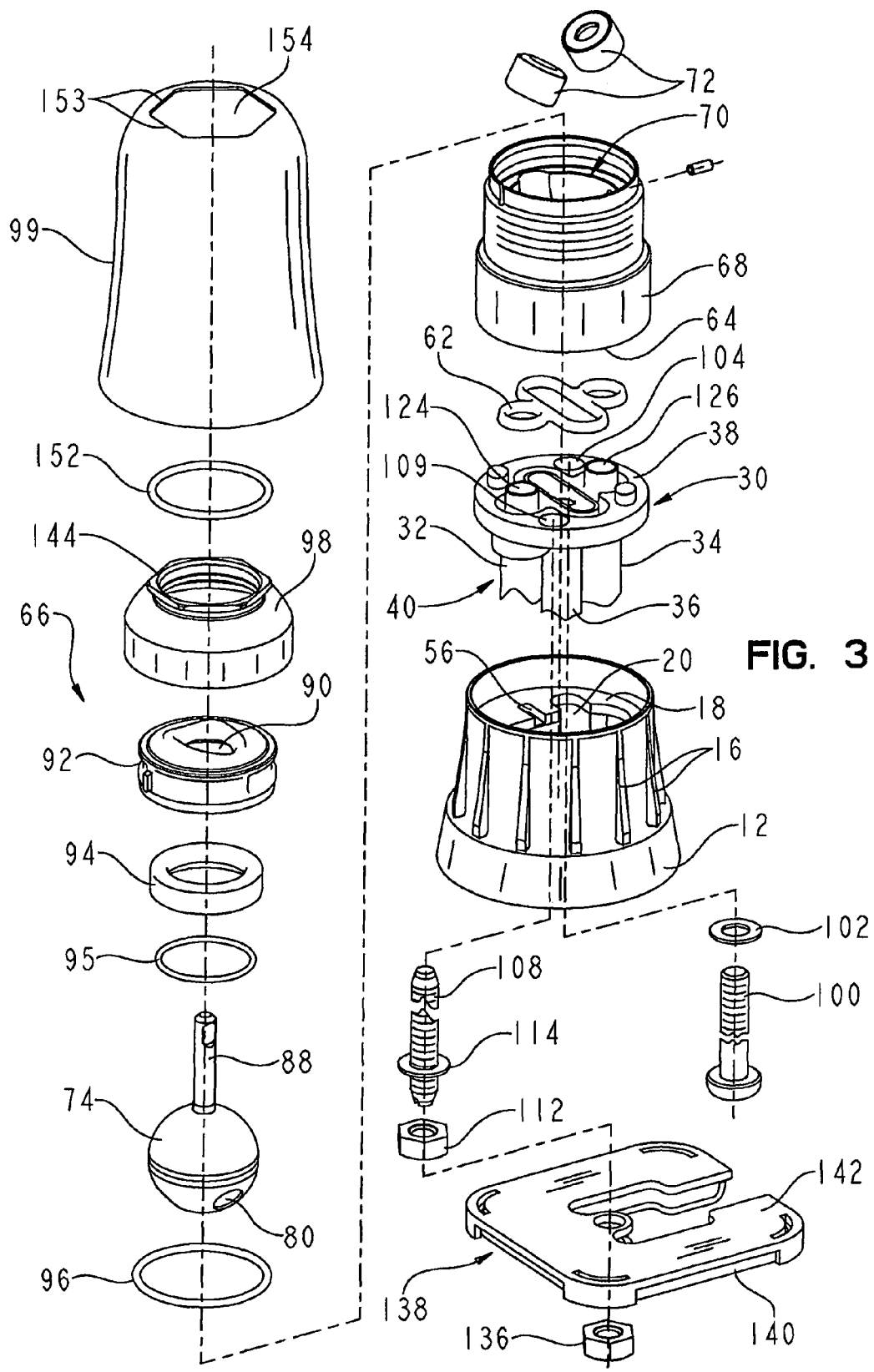
FIG. 3 is a partial exploded perspective view of the mixing valve of FIG. 1.
Figure 4:
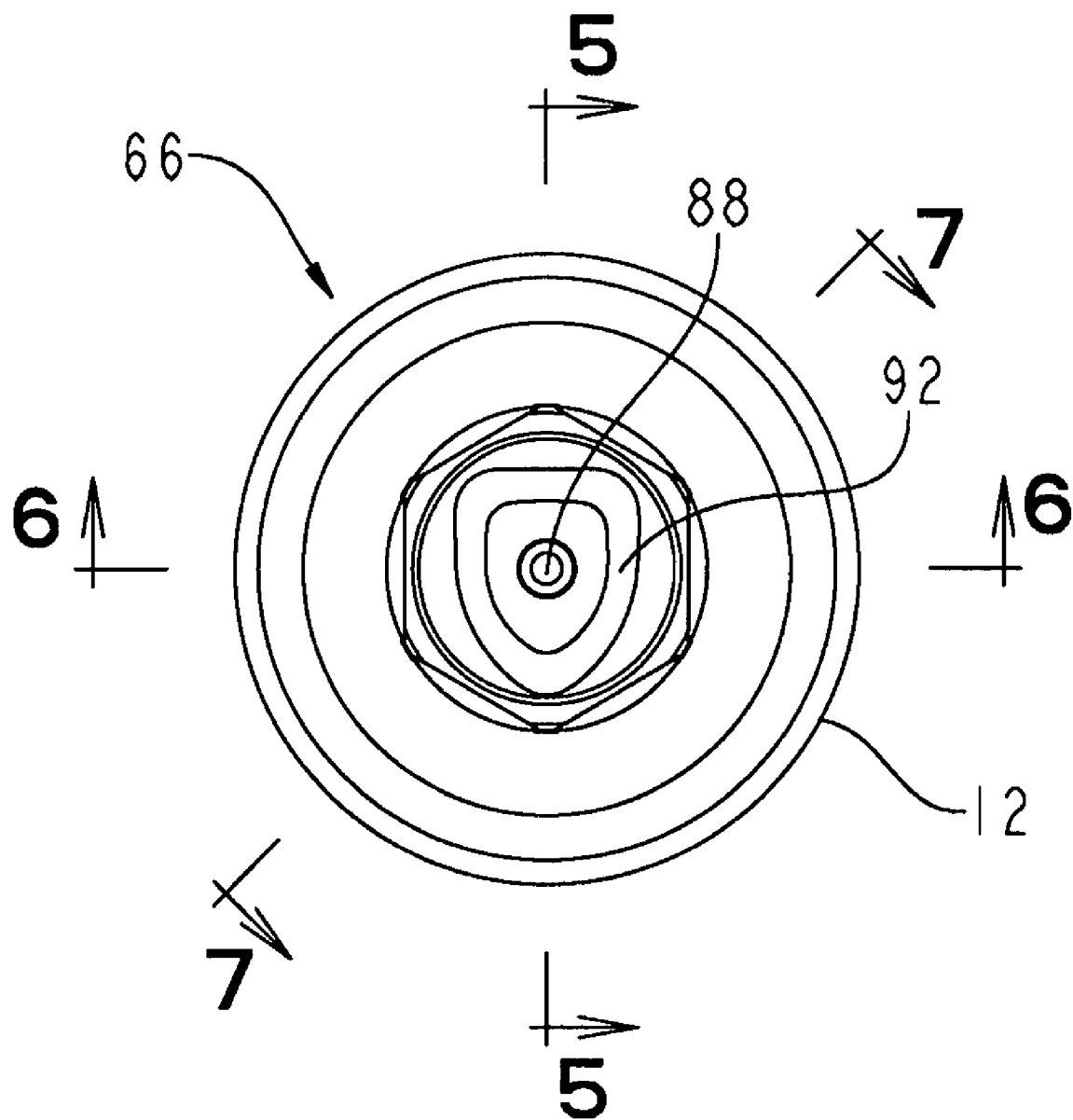
FIG. 4 is a top plan view of the mixing valve of FIG. 2.

Referring initially to FIGS. 1-3, the mixing valve 10 of the present disclosure includes a holder or support base 12 configured to be supported on a sink deck 14 (FIGS. 1 and 7). The support base 12 is illustratively formed of a non-metallic material and in one embodiment is molded from a polymer. As such, the support base 12 is illustratively electrically non-conductive. The support base 12 includes a substantially cylindrical wall 14 having a plurality of circumferentially spaced, radially outwardly extending ribs 16. A platform 18 extends inwardly from the wall 14 and defines an opening 20 (FIG. 3).

A waterway assembly 30 is supported by the platform 18 and includes a first inlet fluid transport component, illustratively a hot water inlet tube 32, a second inlet fluid transport component, illustratively a cold water inlet tube 34, and an outlet fluid transport component, illustratively a tube 36. A puck or disc-shaped base 38 is fluidly coupled to the tubes 32, 34, and 36. The tubes 32, 34, and 36 are illustratively formed of a flexible non-metallic material, such as a polymer. In one illustrative embodiment, the tubes 32, 34, and 36 are formed from a cross-linkable polyethylene. The base 38 is illustratively formed from a non-metallic material compatible to the material of tubes 32, 34, and 36. In the illustrative embodiment, the base 38 is also formed from a cross-linkable polyethylene which is overmolded around the tubes 32, 34, and 36 and subsequently cross-linked, in the manner detailed herein. As used herein, a cross-linkable material illustratively includes thermoplastics and mixtures of thermoplastics and thermosets. It should be noted that the cross-linked polyethylene (PEX) in the base 38 may contain reinforcing elements, such as glass fibers. Additional details regarding the method of overmolding the base 38 are provided in U.S. patent application Ser. No. 11/700,634, filed Jan. 31, 2007, titled "FAUCET INCLUDING A MOLDED WATERWAY ASSEMBLY," Attorney Docket DFC-P0052-01, the disclosure of which is expressly incorporated by reference herein.

As detailed herein, the tubes 32, 34, 36 and base 38 are illustratively formed of polymer. As such, the waterway assembly 30 is electrically non-conductive. While in one illustrative embodiment, the waterway assembly 30 is formed of a cross-linked polyethylene (PEX), it should be appreciated that other polymers may be substituted therefore. For example, the waterway assembly 30 may be formed of any polyethylene (PE)(such as raised temperature resistant polyethylene (PE-RT)), of polypropylene (PP) (such as polypropylene random (PPR)), or of polybutylene (PB). It is further envisioned that the waterway assembly 30 could be formed of cross-linked polyvinyl chloride (PVCX) using silane free radical initiators, of cross-linked polyurethane, or of cross-linked propylene (XLPP) using peroxide or silane free radical initiators.

With reference to FIGS. 3, 6, 8, and 9, first ends 40 of tubes 32, 34, and 36 are positioned within openings 42, 44, and 46 of the base 38. The openings 42, 44, and 46 are aligned along a center axis 47. Each opening 42, 44, and 46 illustratively includes a counterbore 42a, 44a, and 46a which defines a stop surface 48 and cooperates with the first ends 40 of the tubes 32, 34, and 36. A support or reinforcing boss 50 extends downwardly from the lower surface 52 of the base 38 and surrounds openings 42, 44, and 46. The boss 50 provides additional support to the tubes 32, 34, and 36. Second ends 51 of tubes 32 and 34 are fluidly coupled to hot and cold water sources 53A and 53B, respectively. Similarly, the second end 51 of tube 36 is fluidly coupled to a fluid outlet, illustratively defined by a delivery spout 55 (FIG. 7B).

Registration elements, illustratively ribs 54, extend downwardly from the lower surface 52 of the base 38 and are configured to be received within a cooperating notch 56 formed within the platform 18 of the support base 12, thereby facilitating proper orientation of the waterway assembly 30 relative to the support base 12. In a further illustrative embodiment, locking elements, such as resilient tabs (not shown) may extend radially inwardly from the wall 14 of the support base 12 for releasably retaining the waterway assembly 30.

A fluid collecting channel or recess 57 is formed within the upper surface 60 of the base 38 and surrounds the outlet opening 46. A channel 58 is formed in the upper surface 60 of the base 38 and is configured to receive a resilient seal, illustratively a silicone gasket 62. The channel 58 surrounds openings 42 and 44 and recess 57. The gasket 62 provides for a water seal between the upper surface 60 of the base 38 and the planar lower surface 64 of a valve assembly 66.

The valve assembly 66 may comprise a conventional design. Illustratively, the valve assembly 66 may be a known ball type mixing valve assembly. Examples of such valve assemblies are disclosed in U.S. Pat. No. 4,838,304 to Knapp, U.S. Pat. No. 5,615,709 to Knapp, U.S. Pat. No. 5,927,333 to Grassberger, and U.S. Pat. No. 6,920,899 to Haenlein et al., the disclosures of which are all incorporated by reference herein.

Figure 5:
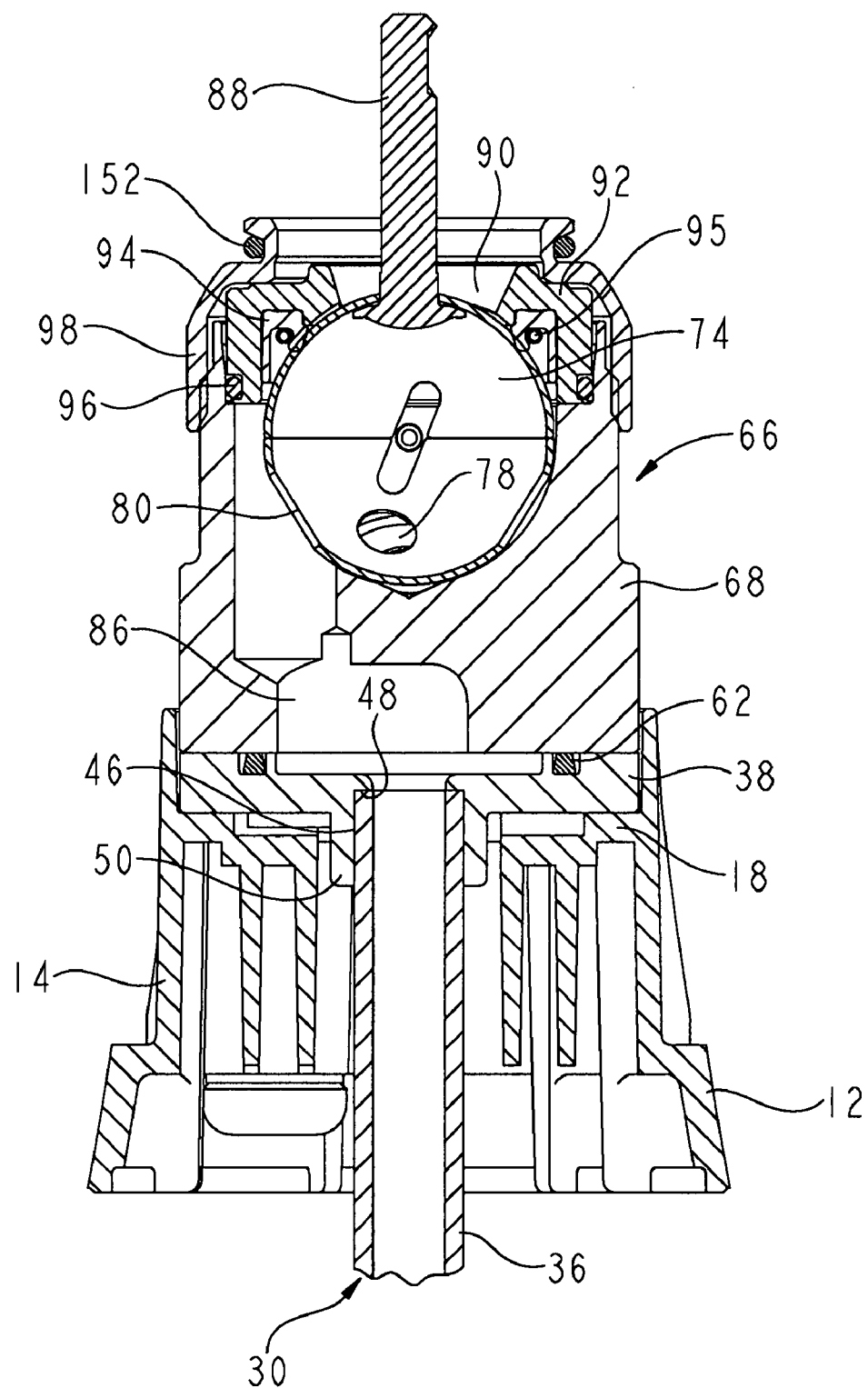
FIG. 5 is a cross-sectional view taken along line 5-5 of FIG. 4.
Figure 6:
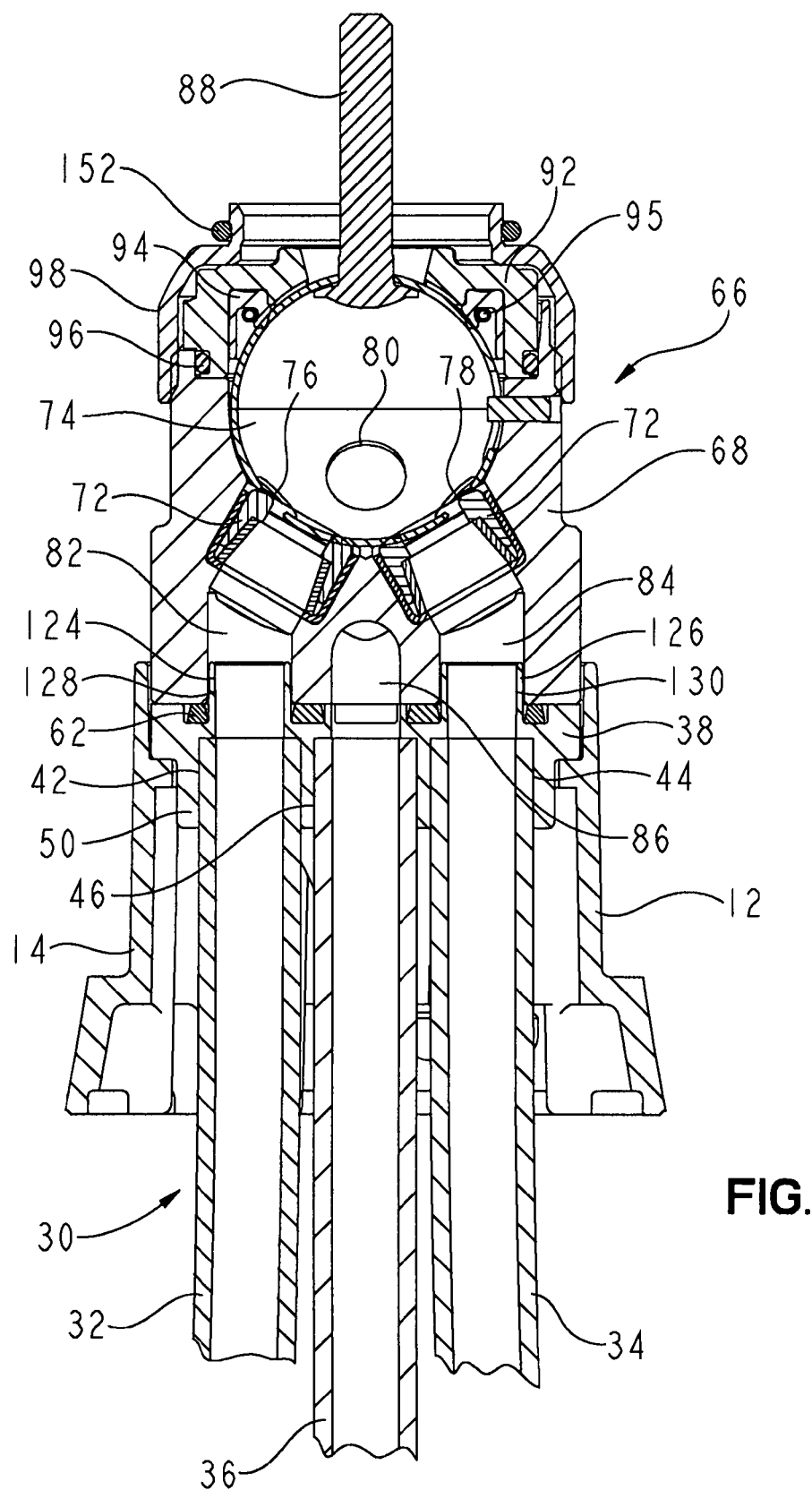
FIG. 6 is a cross-sectional view taken along line 6-6 of FIG. 4.

With reference to FIGS. 1, 5, and 6, the valve assembly 66 illustratively includes a valve body 68 defining a chamber 70. The valve body 68 is illustratively formed from an electrically conductive material, such as brass. A pair of seats 72 are supported within the valve body and are configured to sealingly engage a hollow ball 74, illustratively formed of stainless steel. The ball 74 has a substantially spherical valve surface with hot water inlet openings 76, cold water inlet openings 78, and an outlet opening 80 extending therethrough. Cold water inlet openings 76 cooperate with a cold water inlet port 82, hot water inlet openings 78 cooperate with hot water inlet port 84, and outlet opening 80 cooperates with an outlet port 86 to regulate the passage of water from the inlet ports 82 and 84 to the outlet port 86 by regulating the water mixture ratio and the flow rate. A control stem 88 is connected to the ball 74 and extends through a control opening 90 defined by a cover 92 and is coupled to a handle 93. The control stem 88 and the handle 93 are illustratively formed of an electrically conductive material. A lip seal 94 and an o-ring 95 are received intermediate the cover 92 and the ball 74. Similarly, an o-ring 96 is received intermediate the cover 92 and the valve body 68. A bonnet 98 is threadably received on the valve body 68 for receiving the internal valve components, including ball 74, therein. A sleeve 99 is received over the bonnet 98 as further detailed herein.

The valve body 68 is secured to the support base 12 by a screw 100 and washer 102. The screw 100 passes through an opening 104 formed in the base 38 and is threadably received within a threaded aperture 106 formed in the valve body 68. Similarly, a threaded mounting shaft or shank 108 passes through an opening 109 formed in base 38 and is threadably received within a threaded aperture 110 formed in the valve body 68. A nut 112 and washer 114 are received on the shaft 108 for securing the valve body 68 to the support base 12.

Figure 8:
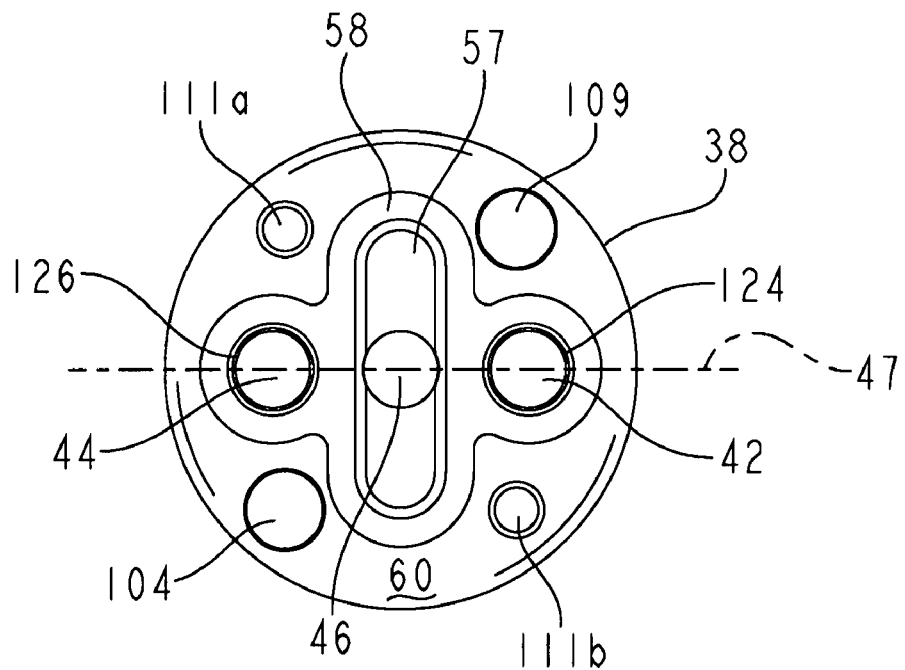
FIG. 8 is a top plan view of the base of the waterway assembly.
Figure 9:
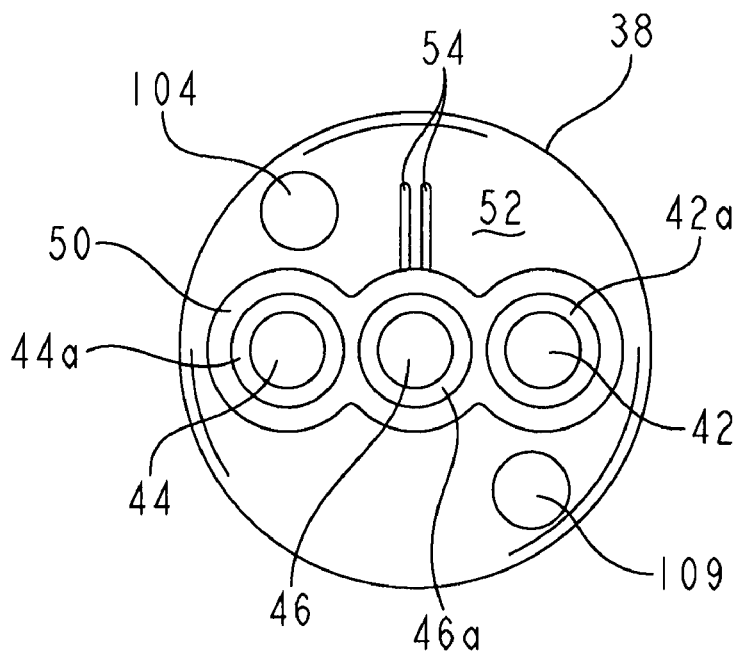
FIG. 9 is a bottom plan view of the base of FIG. 8.
Figure 10:
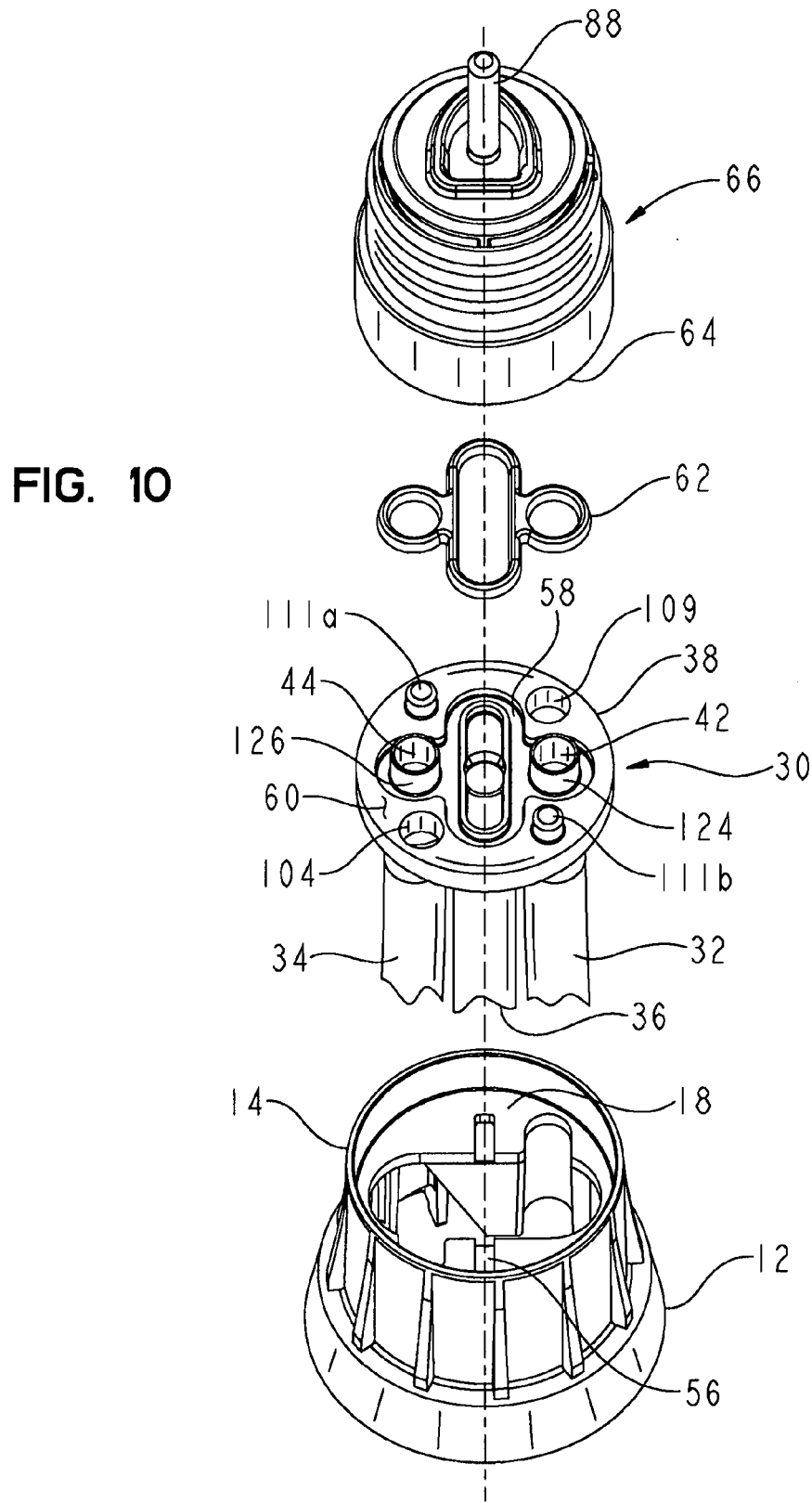
FIG. 10 is an exploded perspective view from the top and rear, showing the valve assembly, the waterway assembly, the seal, and the support base.
Figure 11:
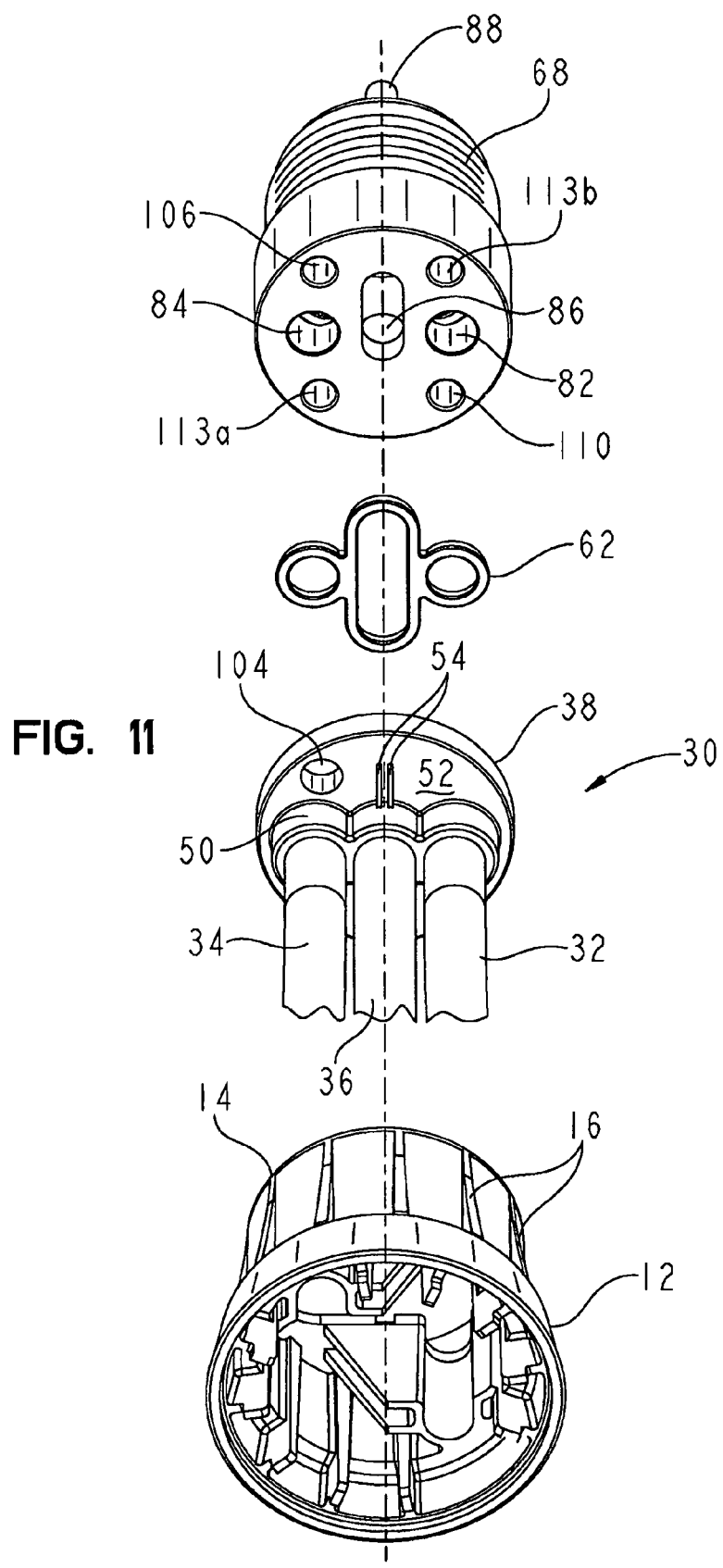
FIG. 11 is an exploded perspective view from the bottom and rear, similar to FIG. 10.

With reference to FIGS. 8 and 10, a pair of locating pegs 111a and 111b extend upwardly from the upper surface 60 of the base 38. The pegs 111a and 111b are configured to be received within cooperating recesses 113a and 113b in the lower surface 64 of valve body 68 to facilitate proper angular orientation of the valve assembly 66 relative to the waterway assembly 30. In a further illustrative embodiment, pegs 111a and 111b may be of different lengths and configured to be received within recesses 113a and 113b with corresponding depths to further facilitate proper orientation. Alternatively, pegs 111a and 111b may be of different cross-sectional shapes and configured to be received within recesses 113a and 113b with cooperating cross-sectional shapes to facilitate proper orientation.

Figure 16:
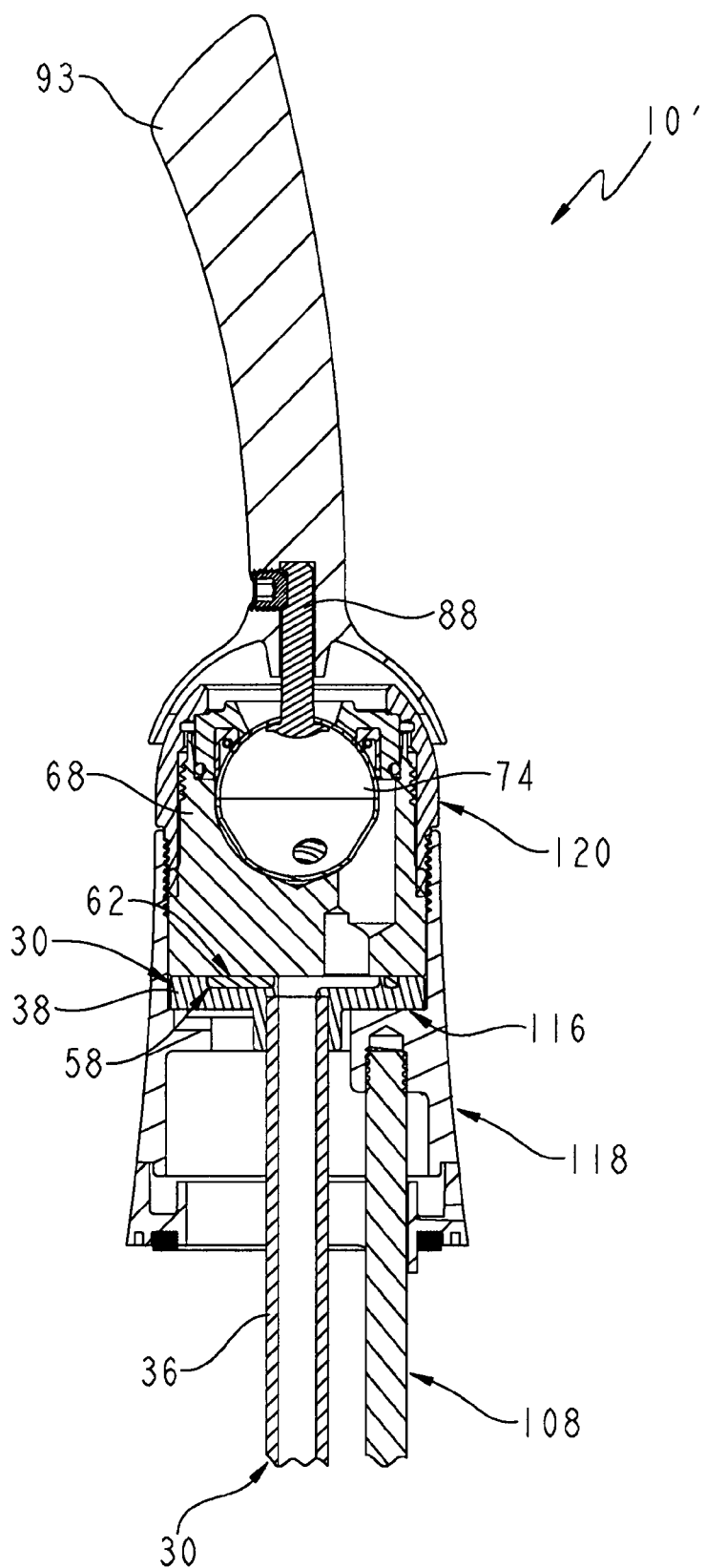
FIG. 16 is a cross-sectional view of a further illustrative embodiment mixing valve.

The screw 100, and the nut 112 on threaded shaft 108, generate compression forces between the valve body 68 and the waterway assembly 30 for compressing the gasket 62 to effect a seal. More particularly, the gasket 62 is compressed between the channel 58 of the base 38 and the lower planar surface 64 of the valve body 68. This compression force may be accomplished in a number of other ways. As shown in the alternative embodiment mixing valve 10' of FIG. 16, the base 38 of the waterway assembly 30 may rest on a ledge 116 formed on a sleeve 118. The valve body 68 rests on top of the base 38. A bonnet 120 threads into the sleeve 118 which compresses the body 68 and waterway assembly 30 together to compress gasket 62 and force a seal. In a further illustrative embodiment, the waterway assembly 30 may have a threads engaging with cooperating threads (not shown) formed on the valve body 68. Additional means to effect sealing between valve body 68 and waterway assembly 30 may be substituted for those detailed above.

In recognition of burst pressure concerns, the illustrative embodiment waterway assembly 30 includes cylindrical projections or sleeves 124 and 126 extending upwardly from upper surface 60 of base 38 and surrounding the openings 42 and 44, respectively, as shown in FIGS. 3, 6, and 8. The projections 124 and 126 are illustratively integrally molded with base 38 and telescope into ports 82 and 84 of the valve body 68, respectively. When the valve assembly is pressurized, the body 66 accepts the load from the thin walls 128 and 130 of the projections 124 and 126 (FIG. 6), thereby preventing extraneous forces from being applied to the corresponding gasket 62 and creating a leak.

The mounting shaft 108 is illustratively formed of an electrically conductive material, such as aluminum. The shaft 108 illustratively extends through the base 38 of the waterway assembly 30 and into the valve body 68. A capacitor sensor 131 is in electrical communication with a controller 132 (FIG. 7), and may be electrically connected to the shaft 108 under the sink deck 14 through a connector, such as a conventional electrical clip 134. The capacitive charge illustratively travels up the shaft 108 through the valve body 66, and into the ball 74. Ultimately the charge will transmit to the handle 93. As such, all visible electrically conductive components, including handle 93 and sleeve 99, are illustratively touch sensitive.

Figure 7A:
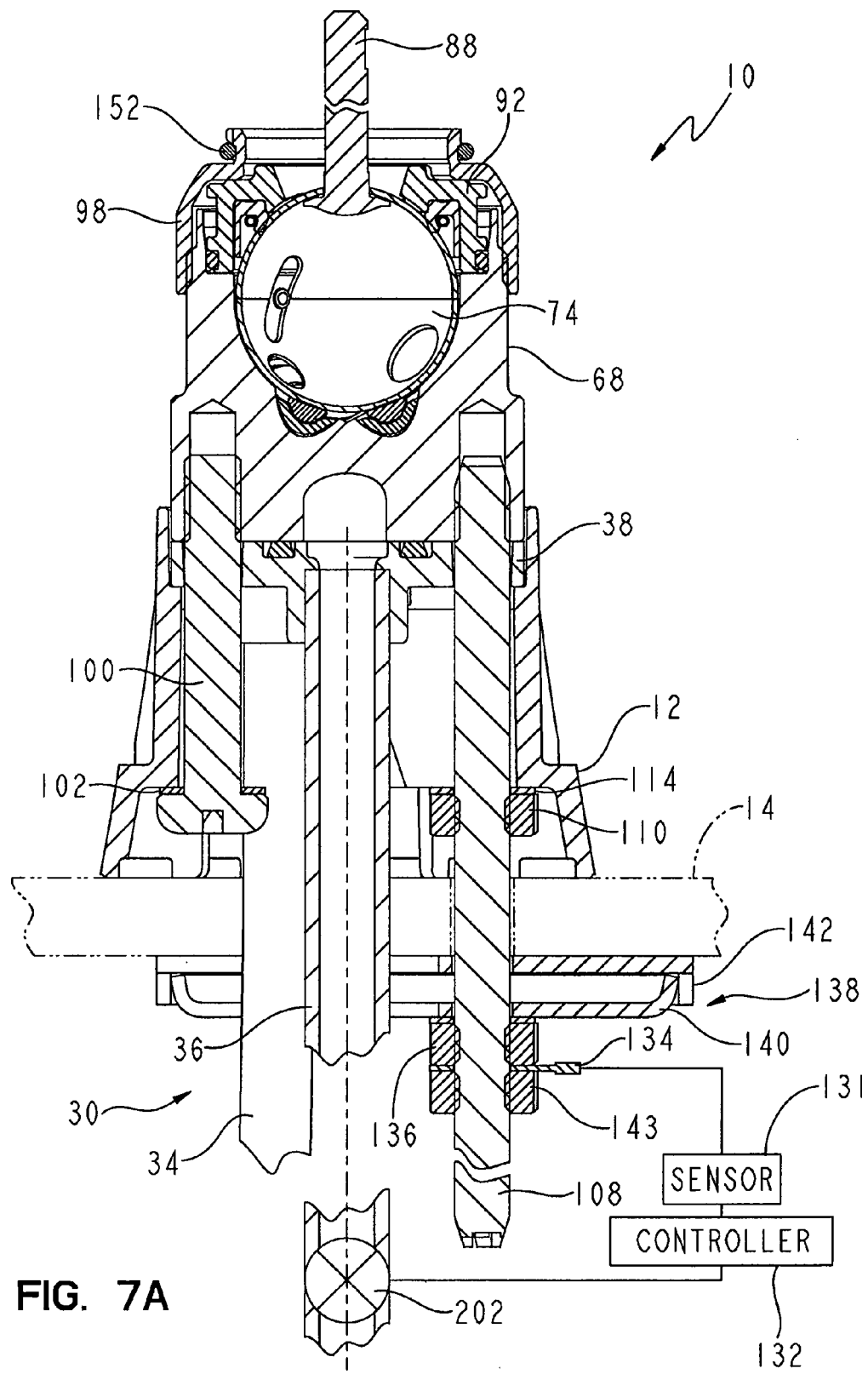
FIG. 7A is a cross-sectional view taken along line 7-7 of FIG. 4, with a capacitive sensor and a controller shown schematically.
Figure 7B:
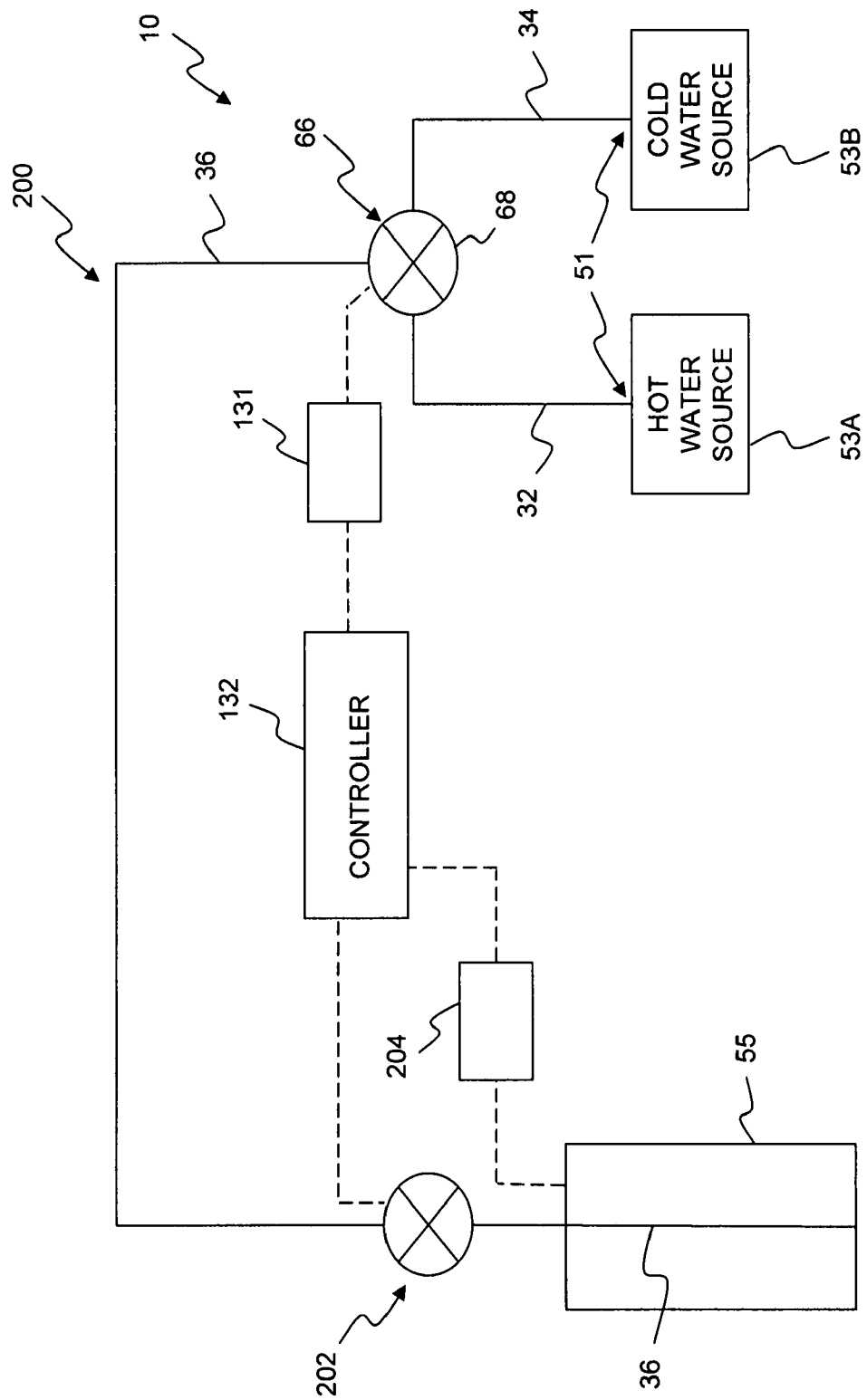
FIG. 7B is a block diagram showing an illustrative electronic faucet system incorporating the mixing valve of FIG. 7A.

As shown in FIGS. 3 and 7A, the base 12 is secured to the sink deck 14 by a nut 136 threadably received on the shaft 108 and cooperating with a mounting bracket 138. The mounting bracket 138 includes a metal support portion 140 and a thermoplastic insulating portion 142 for electrically insulating the shaft 108 from the sink deck 14. As may be appreciated, the valve assembly 66, the sleeve 99, and the handle 93 are electrically insulated from the sink deck 14 by the non-metallic bracket portion 142. An electrical clip 134 is shown captured on the shaft 108 between nut 136 and nut 143 (FIG. 7A).

Referring now to FIG. 7B, the mixing valve 10 may be incorporated within an electronic faucet system 200. More particularly, upon detecting the touch of a user, the capacitive sensor 131 may cause the controller 132 to control operation of an actuator driven valve 202. The actuator driven valve 202 may comprise a conventional motor or solenoid driven valve. As shown, the actuator driven valve 202 is illustratively positioned in series within the outlet tube 36, downstream from the manual valve assembly 66. It should be appreciated that the actuator driven valve 202 may be positioned in other locations within the electronic faucet system 200. For example, the actuator driven valve 202 may be positioned upstream from the manual valve assembly 66. Further, another capacitive sensor 204 may be provided in electrical communication with an electrical conductive portion of the delivery spout 55.

The electrically non-conductive waterway assembly 30 and, more particularly, the outlet tube 36 assists in electrically isolating the water flowing therethrough from the capacitive sensors 131, 204. In other words, the waterway assembly 30 helps prevent the unintended detection by the capacitive sensors 131, 204 of a user's hands within the water flow passing out of the outlet tube 36.

Additional details of capacitive sensors used within electronic faucet assemblies are provided in U.S. Pat. No. 6,962,168, in U.S. patent application Ser. No. 11/641,574, filed Dec. 19, 2006, and in U.S. patent application Ser. No. 60/898,524, filed Jan. 31, 2007, titled "HANDS FREE FAUCET UTILIZING NON-CONDUCTIVE MATERIALS AND CAPACITIVE SENSORS," Attorney Docket DFC-P0074, the disclosures of which are all expressly incorporated by reference herein.

With reference now to FIGS. 3 and 12-15, the sleeve 99 has a decorative outer surface and is configured to substantially conceal the bonnet 98 from view of the ordinary observer. More particularly, the sleeve 99 is configured to eliminate from view the seam or gap between the bonnet 98 and the sleeve 99, common in prior art designs, while also eliminating the need for a finishing surface on the bonnet 98.

The sleeve 99 is illustratively formed from a manufacturing process other than machining. For example, the sleeve 99 may be formed from stamping or hydroforming. The bonnet 98 may be a raw brass component with little or no finishing operations performed on it. The bonnet 98 includes a upper flange 144 defining an undercut or retaining groove 146. Illustratively, the flange 144 has a hexagonal shape with a plurality of flat sides 148 joined at outer connecting points 150. A retaining ring, illustratively a resilient o-ring 152, is received within the grove 146. The sleeve 99 includes an inwardly extending lip 153 defining an opening 154 which is configured to cooperate with the flange 144. Illustratively, the opening 154 has a hexagonal shape slightly larger than that of the flange 144.

Figure 12:
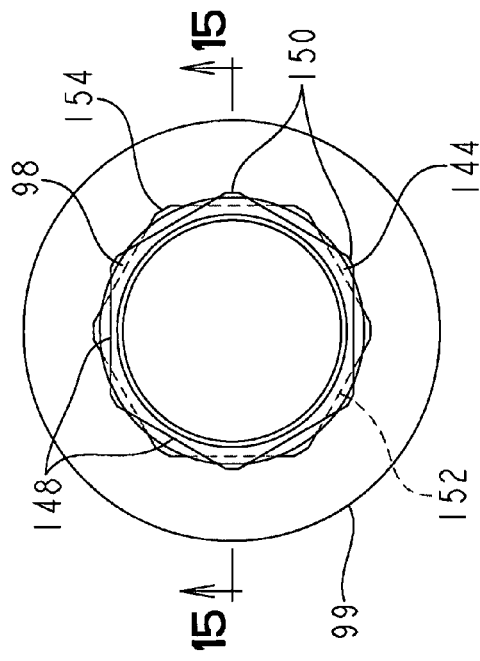
FIG. 12 is a top plan view of the bonnet, the sleeve, and the retaining ring, showing the sleeve in an unlocked position.
Figure 14:
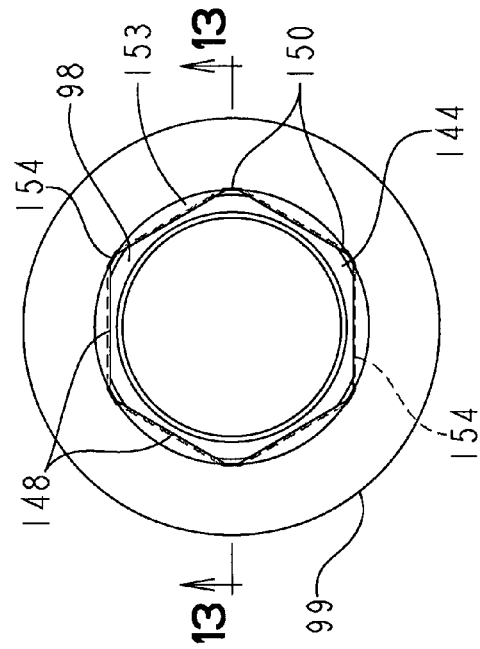
FIG. 14 is a top plan view similar to FIG. 12, showing the sleeve in a locked position.
Figure 13:
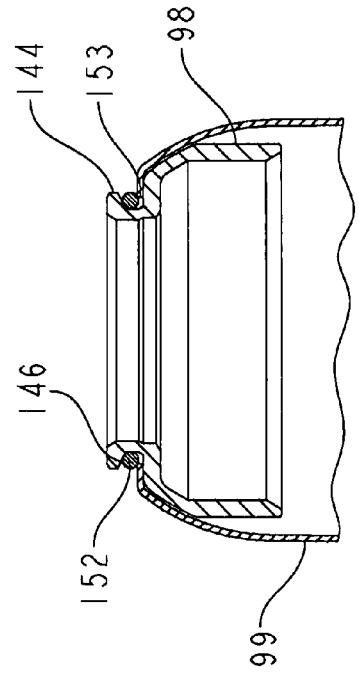
FIG. 13 is a cross-sectional view taken along line 13-13 of FIG. 12.
Figure 15:
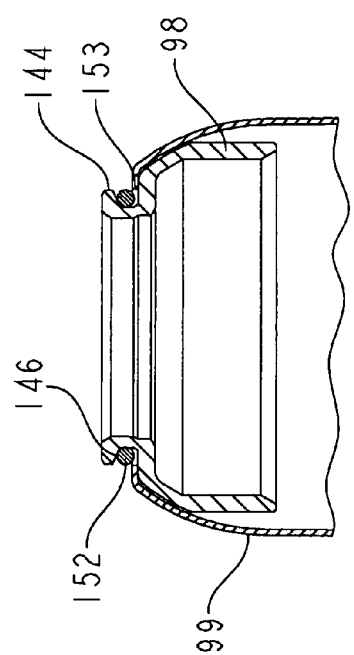
FIG. 15 is a cross-sectional view taken along line 15-15 of FIG. 14.

As shown in FIGS. 12 and 13, in an unlocked position, the hexagonal shaped opening 154 in the upper end of the sleeve 99 is aligned with the flange 144 of the bonnet 98. As such, the sleeve 99 may be moved axially upward and removed from the bonnet 98. FIGS. 14 and 15 illustrate the sleeve 99 rotated by approximately 30 degrees about a longitudinal axis relative to the bonnet 98. As such, six engagement surfaces are defined by the connecting points 150 of the flange 144 to prevent the lip 153 of the sleeve 99 from being axially removed from the bonnet 98. The retaining ring 152 takes up tolerances and prevents rattling of the sleeve 99 relative to the bonnet 98.

Although the invention has been described in detail with reference to certain preferred embodiments, variations and modifications exist within the spirit and scope of the invention as described and defined in the following claims.

The invention claimed is:

1. A fluid delivery device supported by a sink deck, the fluid delivery device comprising:
   a waterway assembly including a base member and a plurality of tubular members coupled to the base member, the waterway assembly being formed of at least one electrically non-conductive material to maintain the waterway assembly electrically isolated from the sink deck;
   a manual valve assembly fluidly coupled to the waterway assembly and configured to regulate a water mixture ratio and a flow rate;
   a handle coupled to the manual valve assembly;
   an actuator driven valve assembly fluidly coupled to the waterway assembly;
   a controller in electrical communication with the actuator driven valve assembly; and
   a capacitive sensor in electrical communication with the controller and configured to detect the touch of a user on the handle, wherein the controller controls the actuator driven valve in response to the touch on the handle detected by the capacitive sensor.

2. The fluid delivery device of claim 1, wherein the capacitive sensor is in electrical communication with the manual valve assembly.

3. The fluid delivery device of claim 2, wherein the manual valve assembly includes an electrically conductive handle in electrical communication with the capacitive sensor.

4. The fluid delivery device of claim 1, further comprising an electrically conductive delivery spout receiving the outlet tubular member, wherein the capacitive sensor is configured to detect the touch of the user on the delivery spout.

5. The fluid delivery device of claim 1, wherein the waterway assembly is formed of a polymer.

6. The fluid delivery device of claim 5, wherein the waterway assembly is formed of a cross-linked polyethylene.

7. The fluid delivery device of claim 1, wherein the manual valve assembly includes a ball valve.

8. The fluid delivery device of claim 1, wherein the base member is overmolded around the plurality of tubular members.

9. The fluid delivery device of claim 8, wherein the base member and the plurality of tubular members are formed of a polymer.

10. The fluid delivery device of claim 9, wherein the base member is formed of a cross-linked polyethylene.

11. The fluid delivery device of claim 9, wherein the plurality of tubular members are formed of a cross-linked polyethylene.

12. The fluid delivery device of claim 1, wherein the plurality of tubular members include a hot water inlet tube, a cold water inlet tube, and an outlet tube, the hot water inlet tube and the cold water inlet tube both providing water to the manual valve assembly and the outlet tube receiving water from the manual valve assembly.

13. The fluid delivery device of claim 12, further comprising an electrically conductive delivery spout receiving the outlet tube, wherein the capacitive sensor is configured to detect the touch of the user on the delivery spout.

14. The fluid delivery device of claim 1, wherein the base member is a puck.

* * * * *